United States Patent

[11] 3,600,067

[72] Inventor: Helmut A. Heine
Herrsching, Upper Bavaria, Germany
[21] Appl. No. 864,786
[22] Filed Oct. 8, 1969
[45] Patented Aug. 17, 1971
[73] Assignee Optotechnik G.m.b.H. and Propper Manufacturing Company, Inc.
[32] Priority Nov. 23, 1968
[33] Germany
[31] P 18 10 536.7

[54] HAND-HELD OPHTHALMOSCOPES
12 Claims, 4 Drawing Figs.

[52] U.S. Cl. ............... 351/12, 351/16
[51] Int. Cl. ............... A61b 3/12
[50] Field of Search ............... 351/6, 9—12, 14, 16

[56] References Cited
UNITED STATES PATENTS

| | | | |
|---|---|---|---|
| 1,791,604 | 2/1931 | Reardon | 351/6 |
| 1,815,866 | 7/1931 | Reese | 351/12 |
| 3,019,699 | 2/1962 | Schenk | 351/12 |
| 3,441,340 | 4/1969 | Moore et al. | 351/6 X |
| 3,501,228 | 3/1970 | Speelman | 351/9 X |

Primary Examiner—David Schonberg
Assistant Examiner—Paul A. Sacher
Attorney—Blum, Moscovitz, Friedman and Kaplan ABSTRACT: A hand-held ophthalmoscope of exceedingly small dimensions capable of performing functions carried out by conventional ophthalmoscopes of much larger size. The ophthalmoscope includes a housing which carries an optical illuminating system. This latter system includes a light source as well as a light-deflecting reflector or prism which directs the light toward the eye which is to be examined. A rotary lens wheel is carried by the housing for situating a selected one of a plurality of lenses along an observation path of the system so that when the operator looks through the selected lens he will see the background of the eye which is to be examined. The rotary lens wheel is transparent and has an inner surface directed toward the interior of the housing and an outer surface carrying indicia which identifies several lenses and is directed toward the operator. A light-conducting structure is situated in the interior of the housing to direct light from the light source to the rear of the transparent lens wheel so that this wheel will be illuminated even in the dark in order to render the indicia visible to the operator so that the operator will know which of the lenses is located at the observation path.

INVENTOR.
HELMUT A. HEINE
BY
Blum, Moscovitz, Friedman & Kaplan
ATTORNEYS

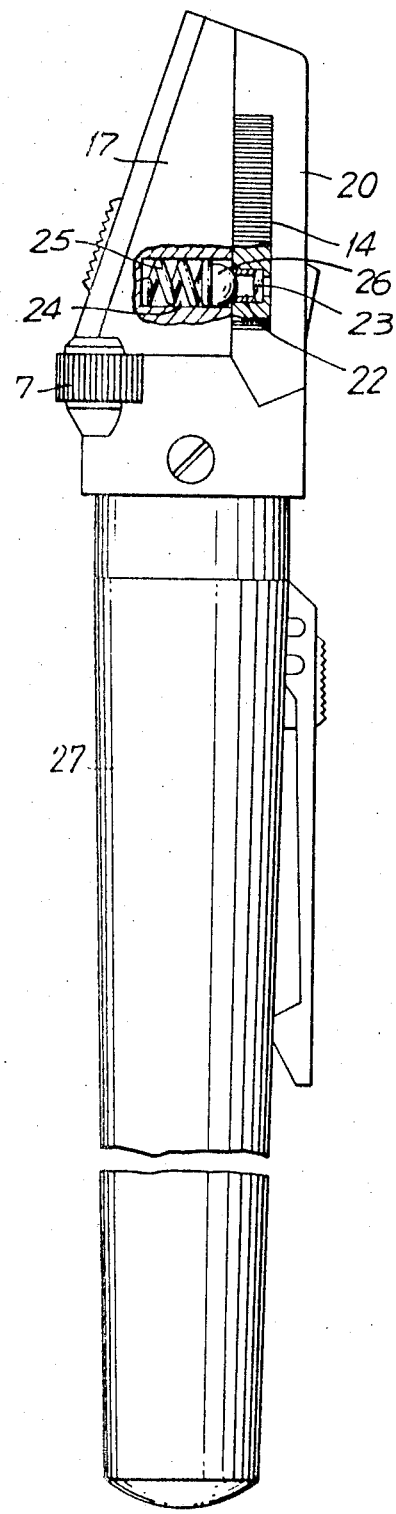
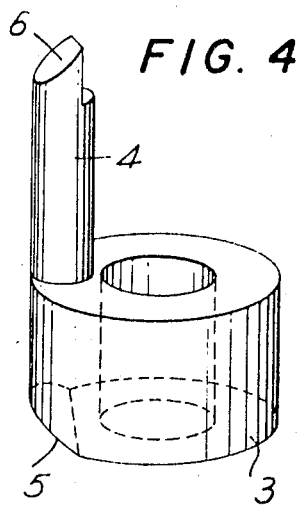

HAND-HELD OPHTHALMOSCOPES

BACKGROUND OF THE INVENTION

The present invention relates to ophthalmoscopes. Ophthalmoscopes are optical instruments provided for observing the background of the living human or animal eye.

Although ophthalmoscopes are well-known and widely used, they suffer from several drawbacks. Thus, in order to accomplish certain functions it is essential that conventional ophthalmoscopes be of relatively large size, rendering them inconvenient to handle and carry about as well as making them of an undesirably large weight Moreover, conventional ophthalmoscopes have certain conflicting requirements which enable them at best to perform according to a compromise between these requirements.

The information which is derived from an ophthalmoscope with respect to the condition of the background of the eye is of particular significance to a physician not only in connection with diagnosing ailments of the eye but also very frequently in connection with diagnosing ailments of other organs. As a result ophthalmoscopes are used not only in consultation chamber of an eye specialist, but also it is frequently necessary to carry out examinations with bed-ridden patients who cannot come to the consultation room in the office of the physician. Thus, internists, neurologists, surgeons and general practitioners often require a useful ophthalmoscope which will enable a rapid examination of the background of the eye to be carried out.

Ophthalmoscopes have been known since the eye reflector was invented by H. Von Helmholtz. Exterior light sources which were initially used were replaced by small electric lamps set into the instrument itself, and in the place of the relatively large flat or hollow reflector use was made of a small reflector or of a small prism situated in the instrument. In order to compensate for refraction abnormalities of the patient and/or of the physician, it has been known for a long time to use corrective lenses situated, for example, on a rotary lens wheel so that a selected lens could be located along the light path used for making the observations of the eye which is examined. Thus, all of the essential elements of an electrically operated hand-held ophthalmoscope are referred to above.

One of the important requirements of a good ophthalmoscope is that the magnitude of the refractive power of the particular lens which is situated in the observation path be rendered conveniently visible even in the dark since operations are frequently carried out with the ophthalmoscope in a room which is fully or to a very large extent in a darkened condition.

It is known to utilize the light which is derived from a lamp of the instrument not only for illumination of the background of the eye which is examined, but also part of this light, particularly that which travels laterally from the lamp, is used for illuminating the lens wheel to indicate the above indicia with respect to the lenses. In the case where the lens wheel is transparent the light travels through the lens wheel. The forward or outer surface of the lens wheel carries the numerals which indicate the required information with respect to the lens which is used. A magnifying lens is provided in a normal way to facilitate reading of the illuminated number.

With a construction of the above type it is essential that the lamp be situated in front of that part of the lens wheel where the window at which the lens numbers are read is located, so that the information desired with respect to the particular lens which is located along the observation path can be obtained easily even in the dark. However, this requirement necessitates a given size for the ophthalmoscope. Thus it is essential that the reflector or prism used for deflecting the illuminating light by approximately 90° be situated directly in front of the particular lens which is in the operative position along the observation path. Since the parallax between the observation path and illuminating path should be maintained as small as possible, the arrangement of the light-deflecting reflector or prism is generally such that a part, for example, a third, of the diameter of the lens in the observation path is covered by an edge of the prism or reflector.

Since on the other hand the window where the lens numbers are read, so as to indicate the refractive power of the particular lens which is at the observation path, cannot be situated at a greater distance than at a part of the lens wheel diametrically opposed to that where the selected lens in the operative position is located, the necessary result is that the distance between the illuminating lamp and the light-deflecting mirror or prism with the known and currently used arrangements must be approximately the size of the diameter of the circle along which the several lenses of the lens wheel are located. A condenser is situated in front of the lamp and an aperture of suitable size is located in front of the condenser to be sharply imaged at the background of the eye which is examined by way of a suitable lens situated generally beneath the reflector or prism.

It is of course highly desirable to make the space between the aperture-imaging lens and the aperture itself sufficiently great to achieve sufficient brightness for the illumination provided by the bundle of light rays which illuminate the base of the eye. The reason for this requirement resides in the fact that the imaging of the filament of the lamp must take place either in the pupil of the eye of the patient or at a location between the reflector or prism and the eye of the patient, in order to achieve a satisfactory utility for the ophthalmoscope.

In a situation where there is an extremely small distance between the aperture of the illuminating field and the imaging lens it is essential that the condenser also have an extremely small focal length so that the above requirements with respect to the location of the image of the lamp filament be fulfilled while at the same time utilizing as great as possible a part of the light issuing from the lamp for imaging the lamp filament so as to achieve a high degree of brightness for the illuminating bundle of light rays. However, the manufacture of condenser lenses of relatively small focal length and sufficiently large diameter is limited for technical reasons. If, for example, as is often the case with ophthalmoscopes, a hemispherical condenser is used, then the diameter thereof is equal to twice the radius of curvature of the condenser. If the focal length is also to be maintained small, so as to fulfill the above requirements, then the diameter must also be maintained small, with the unavoidable result that there is a poor use made of the light issuing from the lamp because the distance between the lamp filament and the first surface of the condenser cannot be reduced as much as desired because of the presence of the envelope of the lamp. As a result the opening angle within which the light issuing from the filament of the lamp travels into the illuminating light path of the ophthalmoscope remains relatively small.

It was first proposed to enlarge the diameter of the lens wheel so that in this way, as described above, the maximum possible distance between the illuminating objective and the condenser or lamp could be enlarged. However, this proposal resulted in an undesirable increase in the size of the ophthalmoscope since the enlarged lens wheel had to have sufficient space within the housing of the ophthalmoscope.

A further difficulty encountered in conventional ophthalmoscopes is that the optical components very often become soiled with dust or other foreign particles so that the output of the instrument is substantially reduced.

Also, where ophthalmoscopes are provided with a plurality of different apertures one of which is selected for use it is of the utmost importance to situate the selected aperture precisely along the optical axis, and this requirement also is difficult to fulfill in conventional ophthalmoscopes.

SUMMARY OF THE INVENTION

It is accordingly a primary objective of the present invention to provide an ophthalmoscope which will avoid all of the above drawbacks.

Thus, it is an object of the invention to provide an improved ophthalmoscope which is not only capable of fulfilling the above conflicting requirements but also can be manufactured at a size and weight much smaller than has heretofore been possible while at the same time performing functions which could only be achieved from much larger ophthalmoscopes.

It is moreover an object of the invention to provide an ophthalmoscope which can easily and conveniently be carried about in a garment pocket during visits of a physician to a hospital or the like.

Thus, it is an object of the invention to provide an ophthalmoscope which is exceedingly small, lightweight, while at the same time sufficiently robust to provide a long operating life.

It is furthermore an object of the invention to provide an ophthalmoscope which will be well protected against soiling, particularly of the sensitive optical components without, however, requiring the inconvenient manipulations which might be necessary in connection with placing the ophthalmoscope in a suitable case or the like.

Furthermore, it is an object of the invention to provide an ophthalmoscope which while capable of fulfilling all of the above requirements nevertheless will achieve a sufficiently great brightness for the purpose of examining the background of the eye, to achieve a reliable result of the examination as well as to fulfill the most important functions which heretofore could be achieved only by relatively large ophthalmoscopes.

Thus, it is an object of the invention to provide an ophthalmoscope which permits the indicia with respect to the particular selected lens to be easily read even in the dark.

Also, it is an object of the invention to provide an ophthalmoscope which will be reliably protected against soiling, particularly of optical elements.

Also, it is an object of the invention to provide an ophthalmoscope which will enable a selected aperture or a selected filter to be located along the optical axis of the optical system.

Furthermore, it is an object of the invention to provide an ophthalmoscope which will enable the image of the aperture to be located either at the background of the eye which is to be examined or at a relatively short distance from the ophthalmoscope.

In addition, it is an object of the invention to provide an ophthalmoscope which makes it possible in a highly efficient manner to render the blood vessels of the eye easily visible.

In accordance with the invention the ophthalmoscope includes a housing which carries an optical illuminating system. This latter system includes a light source and a light-deflecting means for deflecting light from the light source toward the eye which is to be examined. A lens wheel is supported for rotary movement by the housing of the ophthalmoscope, and this lens wheel carries a plurality of different lenses one of which is selected to be located along the observation path along which the physician will observe the condition of the eye which is examined. This lens wheel is transparent and has an inner surface directed toward the interior of the housing and an outer surface directed toward the operator and carrying the indicia for the several lenses of the lens wheel. A light-directing means receives light from the light source and directs it to the rear or inner surface of the lens wheel so that the light travels through the transparent lens wheel to illuminate the indicia on the front or outer surface thereof, thus rendering this indicia visible even in the dark.

BRIEF DESCRIPTION OF DRAWINGS

The invention is illustrated by way of example in the accompanying drawings which form part of this application and in which:

FIG. 3 is a fragmentary partly sectional elevation of the ophthalmoscope as seen in FIG. 1 showing the ophthalmoscope as it appears from the exterior except for the illustration in section of a detent means to be used for the lens wheel; and FIG. 4 is a perspective illustration of the light-directing means of the ophthalmoscope of the invention.

DESCRIPTION OF A PREFERRED EMBODIMENT

Figure 1:
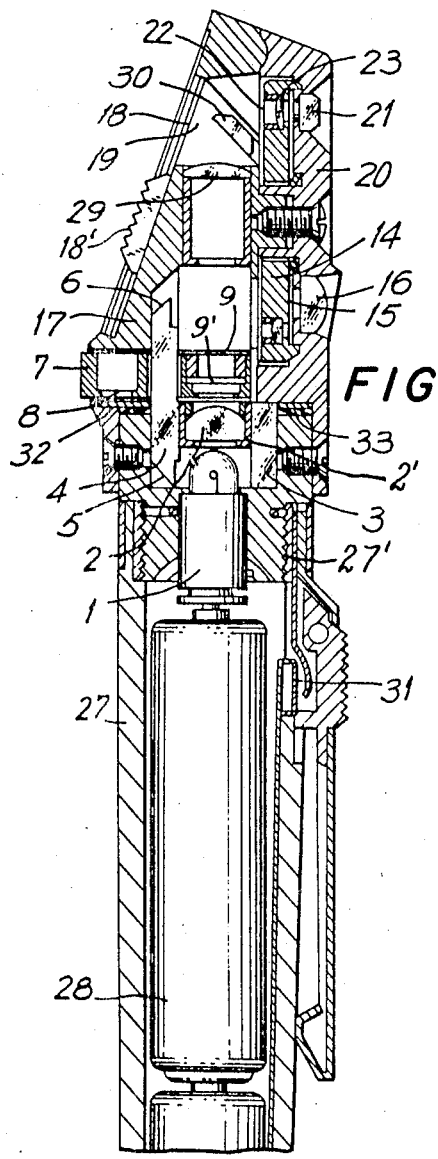
FIG. 1 is a fragmentary sectional elevation of an ophthalmoscope according to the invention taken in a plane which contains the optical axis of the illuminating system.
Figure 1:
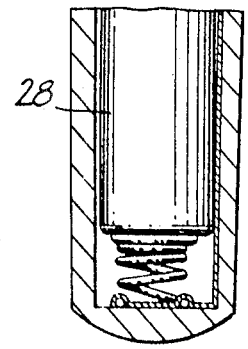

Referring to FIG. 1, the filament type of incandescent lamp 1 forms a light source from which light issues to be collected by the condenser 2, when the lamp 1 is energized. The light which is thus concentrated by condenser 2 passes through an illuminating field aperture 9' and, in the illustrated example, a filter 9 which, for example, is a red free filter so that in this way it is possible to render the blood vessels at the retina more easily visible. The optical system includes, in addition to the above elements an objective 29 which images the illuminating field aperture sharply at a predetermined distance ahead of the ophthalmoscope. Preferably a relatively large imaging distance is selected such as, "infinity" for example, so that with a patient having emmetropia, it is possible to achieve a sharp image of the illuminating field aperture at the base of the eye.

The optical system further includes a light-deflecting means which in the illustrated example is a reflector 30 which deflects the illuminating bundle of light rays through an angle of 90° forwardly to the eye which is examined. The operator looks into the ophthalmoscope through an inlet opening covered by a transparent flat disc 21 situated within and closing the observation aperture. This aperture and transparent cover 21 are located along an observation path which extends over the upper edge of the reflector 30 toward the eye of the patient. In this way it is possible to achieve the smallest extent of parallax between the illuminating path and observation path. The housing 17,20 of the ophthalmoscope carries not only the above-described optical system but also a rotary lens wheel 14 which is transparent and carries a plurality of lenses 23 a selected one of which is situated along the observation path in alignment with the transparent plate 21, as indicated in FIG. 1. The selected lens 23 of the lens wheel 14 serves to compensate for refraction abnormalities in the eye of the patient and/or in the eye of the examining physician, while at the same time it is possible with this construction to determine the magnitude of elevations at the base of the patient's eye.

The entire optical and mechanical structure of the ophthalmoscope are carried by the housing 17,20 which includes the primary housing component 20 and the front component 17 connected to the component 20 to form the ophthalmoscope housing therewith. The entire ophthalmoscope is mounted on a hollow handle 27, with a threaded connection being provided between the ophthalmoscope and handle in the illustrated example. The handle 27 accommodates batteries 28 in its interior, these batteries supplying the energy for the lamp 1. Also the handle 27 carries a manually operable switch 31, in the form of a shiftable switch. Through actuation of this switch the lamp 1 is energized and deenergized.

As explained above, it is required that the illuminating objective 29 have a sufficiently great distance ahead of the lamp 1 or the condenser 2, so as to bring about in this way an optical utility of the light issuing from the lamp. The lens wheel 14 is, however, with the instrument of the invention, maintained at an extremely small size, so as to assure small dimensions for the entire ophthalmoscope. The numerals which indicate the refractive power of the particular lens 23 which is aligned with the observation path are engraved on the outer right side of the lens wheel 14 as viewed in FIG. 1. Thus, at the region 15 there will be numerals diametrically opposed from the particular lens 23 at the observation path indicating the refractive power of the lens 23 at the observation path. These numerals can also be printed or otherwise situated at the outer surface of the lens wheel 14, thus forming an identifying indicia for the lenses carried by the wheel 14.

A direct illumination of the lens wheel by the lamp 1 is not possible because the lamp 1 is situated too far away from the lens wheel 14. In accordance with the invention, therefore, there is provided laterally of the lamp 1 a light-conducting means in the form of a light-conducting bar 4 made of a suitable material, such as, for example, lucite or other acryllic glass having the property of conducting light along the interior of the body from one end to the other end thereof without escape of light from the side surface of the body. Thus, the light-conducting means includes the light-conductive rod or bar 4, shown most clearly in FIG. 4, and provided with the inclined end surfaces 5 and 6 which respectively receive the light from the lamp and discharge the light, this light issuing from the surface 6. These end surfaces 5 and 6 may have an angle of 45°, for example, with respect to the axis of the rod 4. The light which issues laterally from the lamp 1 is thus received at the surface 5 and flows along the interior of the rod 4 to issue from the upper end surface 6 thereof. This upper end surface 6 is situated in an interior chamber of the housing which also receives the lower portion of the transparent wheel 14 at the elevation of the indicia 15 corresponding to the upper selected lens 23, so that in this way the light from the lamp is directed through the wheel 14 to illuminate the indicia on the outer surface of the wheel 14. The light which issues from the end 6 of the light-conducting means passes through the transparent wheel 14 from the inner surface thereof which is directed toward the interior of the housing to the outer surface thereof so as to render the indicia 15 visible even in the dark. In order to facilitate reading of the indicia a magnifying lens 16 can be carried by the housing at the opening thereof through which the indicia 15 becomes visible.

In this way the structure of the invention enables the distance of the illuminating objective 29 from the condenser 2 or the lamp 1 to be completely independent of the diameter of the lens wheel 14. At the same time, a good illumination of the indicia on the lens wheel is assured since the light-conducting rod 4 can have any desired length.

Furthermore, in accordance with the invention the rod 4 serves as a shaft extending through an aperture wheel 7 to serve as a shaft supporting the aperture wheel 7 for rotary movement about an axis parallel to the optical axis, the rod 4 of course extending parallel to the optical axis. In addition the rod 4 forms a single unitary body with the holder for the condenser 2. This result is achieved without difficulty when the holder for the condenser and rod 4 are both made in one piece by injection molding, using a transparent, clear, uncolored plastic having the appearance of transparent glass, for example. Thus, the unit shown in FIG. 4 may be case or injection molded in one operation and in one piece and includes the rod 4 with its inclined ends 5 and 6 as well as the holder 3 for the condenser 2. This holder 3 is a simple cylindrical body integral with and extending laterally from the rod 4 and formed with an axial bore whose axis coincides with the optical axis. The condenser 2 may be mounted directly in the axial bore of the holder 3 or the condenser 2 may be situated within a metal mounting ring 2' which is situated within the holder 3, as illustrated in FIG. 1. Thus, the structure of FIG. 4 which serves not only as a light-conducting means, as a support for the rotary movement of the aperture wheel, and as a holder for the condenser is highly favorable from an economic standpoint, permitting the ophthalmoscope to be manufactured and sold at highly favorable prices, but in addition with this construction it is possible to locate the aperture wheel 7, with respect to the axis of the condenser, with the smallest possible number of dimension tolerances in the most precise manner within the entire assembly so that the greatest possible accuracy is achieved at the lowest possible cost.

The structure of the invention includes a detent means for releasably retaining the aperture wheel 7 at a selected angular position, and the constructive principle used for the detent means which coacts with the aperture wheel is also used for a detent means which coacts with the lens wheel 14 for maintaining the later precisely at a preselected angular position.

Thus, referring to FIG. 3, it will be seen that the detent means which coacts with the lens wheel 14 includes a part of the front housing portion 17 formed with a bore 24 which receives a spring 25 of the detent means. This spring 25 presses a ball 26 of the detent means into a bore 22 of the lens wheel 14. This lens wheel 14 is provided with the several bores 22 angularly distributed along a given circle around the axis of the lens wheel and respectively accommodating the lenses 23 in their interiors. Thus, each of the bores of the lens wheel which receives a lens 23 also acts as a recess for receiving the spring-pressed ball of the detent means. In this way it is possible to achieve an extremely high accuracy in the positioning of the lens wheel with this releasable detent means. This feature is of considerable significance in order to have the assurance that parallax between the illuminating and observation paths is maintained as small as possible with the selected lens 23 being situated so that it is fully operative without any possible undesirable covering of the selected lens 23 by the primary housing component 20 at the observation window thereof where the flat transparent closure plate 21 is provided.

Inasmuch as the ophthalmoscope should have a number of different illuminating field apertures in order to fulfill its purposes without any limitations, the aperture wheel 7 is provided with a plurality of illuminating field apertures at one or more of which it is possible to locate color filters. In the particular example which is illustrated in FIG. 1 there are four illuminating field apertures of which two are visible in the drawing while the other two are situated ahead of and behind the plane of FIG. 1. These illuminating field apertures can be in the form of circular apertures of different diameters or they can take the form of elongated gap-type of apertures so that is a possible to provide gap or slit illumination with the ophthalmoscope. It is also possible to provide apertures of semicircular configuration to achieve a good operation of the ophthalmoscope because of the reduction of reflection from the cornea of the patient particularly where the pupil has not been enlarged. It is also possible to utilize color filters, particularly red-free filters, so as to provide a better visibility for the blood vessels. In FIG. 1 the filter 9 is shown in an operative position along the optical axis of the illuminating system.

In order to be able to locate the aperture wheel 7, even through the rod 4 extends through a central journal thereof, in a precisely determined angular position properly aligning the illuminating field aperture with the condenser 2, the structure of the invention also includes the feature according to which the axis of the rod 4 coincides with the axis of the wheel 7. Only with such an arrangement does it become possible to maintain the entire assembly as compact as possible so as to occupy the smallest possible space while at the same time having a relatively large number of illuminating field apertures from which a selection of a particular aperture can be made, and while at the same time achieving a good illumination of the indica on the lens wheel in the manner described above.

With an ophthalmoscope it is highly desirable to have available not only a relatively small aperture for the bundle of light rays, as when operating the ophthalmoscope with a pupil which has not been widened, particularly when examining macula lutea, but also it is desirable to have available a relatively large aperture for the illuminating light rays so that it is possible to simultaneously illuminate the largest area of the retina with a widened pupil. For these reasons it is desirable to make one of the apertures as large as possible. The largest possible illuminating field aperture, or the largest diameter thereof, is determined by the largest permissible opening of the condenser 2. Thus, it is desired to make the diameter of the illuminating field aperture of largest size as equal as possible or only slightly smaller than the effective condenser aperture. For these reasons it is required that the illuminating field aperture of largest size be centered as accurately as possible with respect to the optical axis of the condenser 2. This of course results in a requirement that the aperture wheel 7 be provided with an extremely accurate detent structure or the like to determine the angular position of the wheel 7, so as to assure that the apertures will always return reliably to precisely the same locations situated exactly along the optical axis even when there is a frequent actuation of the aperture wheel, so as to guarantee that each aperture will have its center situated precisely in the optical axis of the condenser.

Figure 2:
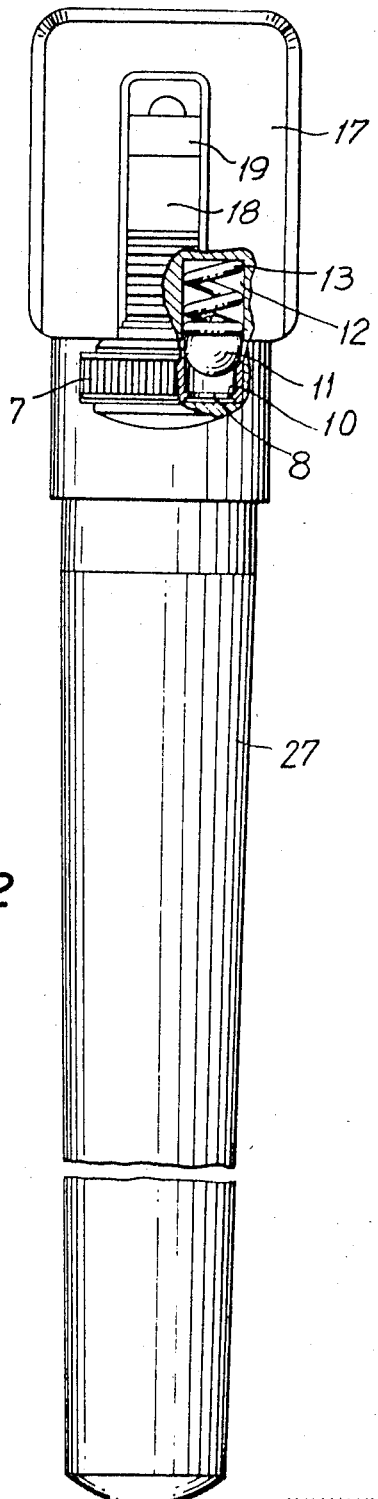
FIG. 2 is a fragmentary partly sectional elevation of the ophthalmoscope of FIG. 1 as seen from the left of FIG. 1, the sectional part of FIG. 2 illustrating a releasable detent assembly for an aperture wheel.

In accordance with the invention this structure is achieved, in the manner illustrated in FIG. 2, with a detent means which includes the spring pressed ball 11 received in a bore 12 of the front housing component 17 and urged by spring 13 downwardly against the aperture wheel 7. In this way the openings of the aperture wheel 7 which serve to accommodate the illuminating field apertures serve at the same time as detent recesses to receive the spring-pressed detent ball 11. FIG. 2 illustrates how the spring 13 urges the detent ball 11 into the bore 10 of the wheel 7. Also it is apparent from FIG. 2 that the illuminating field aperture 8 is accommodated in the lower region of the opening 10 beneath the ball 11. Thus, by providing openings which simultaneously serve as detent recesses the greatest possible accuracy in the angular positioning of the aperture wheel is assured. In this way the diameter of the largest image field aperture can approach the size of the effective diameter of the condenser with only small accuracy tolerances being required.

The soiling of an ophthalmoscope by depositions of dust or condensing of vapors onto components is a problem which is frequently encountered. In particular the lenses of the lens wheel are subjected to this problem because with most of the known ophthalmoscopes the dust has access to the ophthalmoscope from the front and rear sides thereof. The dust can easily enter into the ophthalmoscope through the generally open observation aperture directed toward the eye of the operator so as to become deposited on the lenses of the lens wheel, and it is also possible for the dust to enter through the exit window of the light to settle on the other side of the lenses. Inasmuch as many operators of ophthalmoscopes begin the operation with a lens of predetermined refractive power corresponding to the refraction error of the particular operator, so that when the ophthalmoscope is not used it is almost always this particular lens which is in the operating position in front of the observation window, it is precisely this one lens which receives dust deposits to such an extent that it becomes no longer possible to look through lens. Then the ophthalmoscope must be submitted for repairs, since cleaning of the small lens in the interior of the ophthalmoscope cannot be carried out by the operator of the ophthalmoscope.

Through both of the above openings in the housing of the ophthalmoscope it is possible not only to expose the lens wheel to soiling by dust deposits and the like but also other elements of the illuminating system are subjected to this undesirable phenomenon. In particular dust deposits which settle on the condenser lenses, the illuminating field apertures, and filters located at the latter apertures form a particular source of trouble because each particle of dust becomes imaged to a strongly enlarged extent in the illuminating field of the ophthalmoscope and thus brings about particularly harmful effects in the operation of the ophthalmoscope.

It is therefore proposed in accordance with the invention to take certain constructive measures which will to a very great extent prevent any soiling of the instrument when it is used. In accordance with the invention the exit window 19 for the light is closed when the instrument is not used by a dusttight protective cover. This dusttight protective cover is, in accordance with the invention, a component of the instrument of the invention and is movable either by swinging, turning, or shifting so as to be displaced to a covering position closing the light-exit window 19. In the example illustrated in FIG. 1 the dust-tight protective cover is in the form of a shiftable slide 18, which, when the ophthalmoscope is not used, is shifted to a closed position closing the exit window 19. In FIG. 1 the cover slide 18 is shown in its closed position while in FIG. 2 it is shown in an open position. The slidable cover 18 of the invention is preferably made of a transparent material of conspicuous color such as red, for example, any suitable plastic being used for this purpose. In this way the operator will immediately know that the exit window is covered by the slide 18 when the operator looks into the ophthalmoscope, so that it is not possible to erroneously operate the ophthalmoscope with the cover 18 in its closed position. The slide 18 will remain in any position it is shifted to be reason of its frictional engagement with the housing component 17. At its lower portion the slide 18 is provided with a raised part 18′ having transversely extending teeth accessible to a finger of the operator, as is clearly apparent from FIGS. 1 and 2, so that simply by touching the exterior teeth at the raised part of the slide 18 the operator can manually shift the slide 18 to any desired position, such as either of the positions shown in FIGS. 1 and 2, respectively, without smudging or otherwise detracting from the effectiveness of the upper portion of the slide 18.

In order to also protect the observation opening against entrance of dust or other deposits into the interior of the ophthalmoscope this observation opening is closed by the flat glass disc 21. Since the exterior surface of this disc 21 will of course receive deposits of dust, it is situated in such a way that this exterior surface of the cover 21 can be easily cleaned without any difficulty. However, in order to protect this cover 21 from scratching or other injury, as would be the case if the exterior surface of the cover 21 were situated at or outwardly beyond the exterior surface of the housing component 20, this housing 20 is formed with a frustoconical depression leading to the observation aperture which is closed by the plate 21 and having such a size that while easy cleaning of the plate 21 is possible nevertheless the plate 21 is sufficiently recessed to be protected against scratching or other injury.

With the particular construction of the invention as described above it is hardly possible for the aperture wheel or the apertures and filters carried thereby to become soiled with dust deposits or the like because of the highly protective arrangement of these components in the assembly, nevertheless the structure of the invention takes suitable measures in this connection also to prevent entry of dust and the into the opthalmoscope at the location of the aperture wheel. For this purpose a spring ring 33 (FIG. 1) having a suitably dished configuration, presses a sealing ring 32 upwardly against the aperture wheel 7. At the same time the aperture wheel itself is pressed against a downwardly directed stop surface of the front housing component 17, so that neither the upper side nor the lower side of the aperture wheel will permit dust to enter. This is of particular significance because even an extremely small amount of dust at the edges of the apertures or at the filters become readily noticed in a most unpleasant manner since the illuminating field apertures are imaged in a greatly enlarged manner by the illuminating objective 29. The above-described dust-protecting structure at the aperture wheel increases, thus, the extent to which the ophthalmoscope of the invention will provide valuable use.

According to a particular embodiment of the invention the slide 18 is constructed in such a way that that part thereof which in the closed position of the slide is situated in front of the light-exit window is made of a transparent material having flat, parallel opposed surfaces. In particular, the arrangement is such that the slide 18 is made of a transparent green plastic having a spectral absorption designed particularly to prevent red light from passing through. With a suitable thickness for the upper part of the slide 18 it is then possible to operate the ophthalmoscope with the slide 18 in its closed position, so that now the slide 18 will function not only to protect against the entry of dust but also as a green or red-free filter, or as a filter of another color such as a blue filter to be used in fluorescent operations of the ophthalmoscope. In this case it is not necessary to provide in one of the possible angular positions of the aperture wheel 7 a color filter to be situated along the optical axis, so that instead it is possible to have an additional illuminating field aperture such as, for example, an aperture of extremely small diameter.

Since the plane in which the slide 18 is located is situated at an angle substantially different from 90° with respect to the direction of the light bundle issuing from the instrument through the window 19, and since the observation path extends also parallel to the direction of travel of the light through the window 19 toward the eye, undesirable reflections at the surfaces of the cover 18, which would greatly detract from the effectiveness of the operation, are reliably excluded with the filter which also serves as the dusttight protective closure. If the filter formed by the cover 18 did indeed extend approximately perpendicularly to the path of light travel and the observation path, then because of the strong reflection at both surfaces of such a dust-protecting slide in its closed position it would hardly be possible to make any use of the instrument whatsoever. The arrangement of the invention according to which the dust-protecting slide is situated at a substantial angle different from 90° with respect to the path of light travel and path of observation makes it possible to use the slide 18 also as a filter.

According to a further modification of the concept of the invention it is also possible to provide at that part of the slide 18 through which the bundle of light travels after being reflected by the reflector 30 or a prism equivalent thereto, a positive or collecting lens of suitable refractive power. With such a construction the image of the illuminating field aperture will not be located at a relatively great distance from the ophthalmoscope but instead can be situated at a relatively short distance in front of the opthalmoscope in accordance with the particular focal length of the lens which is carried by and forms part of the cover 18 with such a construction. The focal length of this lens is selected in such a way that the image of the aperture is located approximately 30—40 mm. in front of the ophthalmoscope. The resulting aperture image is, corresponding to the short imaging distance, small and thus very bright. Within the aperture wheel 7 there are provided, among the other apertures, as pointed out above, slit-shaped apertures. The very bright image of such slit apertures, provided with a positive lens of the above type carried by and forming part of the dust cover 18, is highly suitable for use of the ophthalmoscope as a hand-held lamp and provides the instrument with an even more universal utility. Thus, with this particular embodiment of the invention the cover slide 18 preferably is made not of a colored plastic but rather of a colorless clear glass type of plastic. The positive lens which thus is carried by and forms part of the cover slide 18 may be injection molded in one piece with remainder of the slide 18.

The entire ophthalmoscope is mounted on the battery or cable holding handle, being threaded thereto as shown at 27' in the example of FIG. 1. The hollow handle can, if desired, receive suitable dry cell type of batteries or rechargeable cells. In correspondence with the small dimensions of the entire ophthalmoscope, small dimensions are also provided for these batteries. The handle which accommodates the batteries also carries the switch mechanism for tuning the lamp 1 on and off.

Thus, with all or part of the above-described features of the invention it becomes possible to provide an exceedingly small ophthalmoscope having operating capabilities of the highest optical quality and capable of carrying out the most important functions which heretofore could only be carried out by much large instruments.

What I claim is:

1. In a hand-held ophthalmoscope, a housing having a hollow interior, an optical illuminating system carried by said housing in the interior thereof and including a light source and a light-deflecting means for directing light along an optical axis of said illuminating system from the light source toward an eye which is to be viewed, an observation system also carried by said housing and including a rotary lens wheel carrying a plurality of lenses for situating a selected lens along an observation light path of the observation system at that part thereof through which the operator observes the eye, said rotary lens wheel being supported for rotary movement by said housing and being made of a transparent material provided with an inner surface directed toward and communicating with the interior of the housing at an interior portion thereof which is axially displaced along said optical axis from said light source between the latter and said light-deflecting means and said rotary lens wheel having an outer surface directed outwardly toward the operator and carrying indicia for respectively indicating which of the lenses of the lens wheel is in an operative position at the observation path, and light-conducting means situated entirely in the interior of said housing and being spaced in its entirety radially beyond said optical axis and extending parallel to said optical axis from a location situated beside said light source to a location communicating with said interior portion of said housing with which said inner surface of said rotary lens wheel communicates for receiving light radiating radially from said light source and for conducting the received light along a path spaced radially beyond and extending parallel to said optical axis into said interior portion of said housing to illuminate said inner surface of said transparent lens wheel for directing through the latter light which illuminates the indicia even in the dark, so that the operator knows which of the lenses has been located at the observation path.

2. The combination of claim 1 and wherein a rotary aperture wheel is rotatable at least partly within said housing and has an axis of rotation extending parallel to the optical axis of the optical illuminating system, said aperture wheel being formed with openings extending therethrough parallel to its axis of rotation and forming apertures one of which may be selected to be situated along the optical axis, and detent means coacting with said aperture wheel for releasably maintaining the latter at a selected angular position, said detent means including a spring-pressed ball urged into one of said openings of said wheel so that said openings function not only to accommodate exposure apertures but also as part of the detent structure for releasably situating a selected aperture at the optical axis.

3. The combination of claim 2 and wherein at least one filter is supported in one of said openings of said aperture wheel.

4. The combination of claim 1 and wherein said lens wheel is formed with openings which respectively receive different lenses, and a spring-pressed ball carried by said housing and urged into a selected one of said openings for releasably holding said lens wheel at a selected angular position, whereby the openings of said lens wheel which receives said lenses also function as part of the detent structure for releasably holding the lens wheel at a selected position.

5. The combination of claim 1 and wherein said housing has an exit window through which light travels from the housing toward an eye which is to be examined, and slidable closure means shiftably carried by said housing for closing and opening said window to prevent dust from entering through the latter window when the ophthalmoscope is not used.

6. The combination of claim 1 and wherein said housing has an observation opening through which the operator looks into said housing along said observation path, and said housing carrying in said observation opening a transparent plate which prevents dust from entering into said housing through said observation opening thereof, the latter opening having a frustoconical configuration and terminating at an outer surface of said housing which is directed toward the operator and which is situated beyond said transparent plate by a distance sufficient to enable the latter to be conveniently cleaned while protecting said transparent plate from being scratched or otherwise injured.

7. The combination of claim 1 and wherein a hollow handle is releasably fixed to and carries said housing, said handle accommodating in its interior batteries for supplying electrical energy to said light source and said handle also carrying a manually operable switch for closing and opening the circuit between batteries and said light source.

8. The combination of claim 1 and wherein a rotary aperture wheel is rotatable at least partly within said housing and has an axis of rotation extending parallel to the optical axis of the optical illuminating system, said aperture wheel being formed with openings extending therethrough parallel to its axis of rotation and forming apertures one of which may be selected to be situated along the optical axis, said light-conducting means including an elongated light-conducting bar which extends parallel to said optical axis from the location besides said light source to said interior portion of said housing, said bar extending through said aperture wheel centrally of the latter and functioning also as a shaft on which said aperture wheel is supported for rotary movement.

9. The combination of claim 8 and wherein said system also includes a condenser, said light-conducting means having a portion forming a holder for said condenser.

10. The combination of claim 5 and wherein said slide is made of a transparent, colored plastic and is shiftable in a plane extending angularly across light issuing through said exit window at an angle which is substantially different from an angle of 90°.

11. The combination of claim 10 and wherein said slide is green.

12. The combination of claim 5 and wherein said slide carries a positive lens situated in the path of light rays passing through said exit window when said slide is in a closed position covering said window so that positive lens will situate an image closer to the opthalmoscope than when the light rays pass through the open exit window.